United States Patent
Oberdörfer et al.

(10) Patent No.: US 10,927,992 B2
(45) Date of Patent: Feb. 23, 2021

(54) PLUG-IN CONNECTOR FOR MEDIA LINES HAVING INDICATION OF THE PLUGGED-IN STATE

(71) Applicant: VOSS AUTOMOTIVE GMBH, Wipperfürth (DE)

(72) Inventors: Alexander Oberdörfer, Radevormwald (DE); Lukas Röhrig, Marienheide (DE)

(73) Assignee: VOSS Automotive GmbH, Wipperfürth (DE)

( * ) Notice: Subject to any disclaimer, the term of this patent is extended or adjusted under 35 U.S.C. 154(b) by 383 days.

(21) Appl. No.: 15/770,119

(22) PCT Filed: Oct. 19, 2016

(86) PCT No.: PCT/EP2016/075015
§ 371 (c)(1),
(2) Date: Apr. 20, 2018

(87) PCT Pub. No.: WO2017/067949
PCT Pub. Date: Apr. 27, 2017

(65) Prior Publication Data
US 2018/0306363 A1 Oct. 25, 2018

(30) Foreign Application Priority Data
Oct. 21, 2015 (DE) ...................... 10 2015 117 966.0

(51) Int. Cl.
*F16L 37/14* (2006.01)
*F16L 53/38* (2018.01)
(Continued)

(52) U.S. Cl.
CPC ........... *F16L 53/38* (2018.01); *F16L 37/0885* (2019.08); *F16L 37/144* (2013.01); *F16L 53/35* (2018.01); *F16L 25/01* (2013.01); *F16L 2201/10* (2013.01)

(58) Field of Classification Search
CPC . F16L 37/144; F16L 37/0885; F16L 37/0841; F16L 37/088; F16L 53/38; F16L 2201/10
(Continued)

(56) References Cited

U.S. PATENT DOCUMENTS 6,702,335 B2   3/2004   Bahner et al.
8,591,241 B2   11/2013  Rosenfeld et al.
(Continued)

FOREIGN PATENT DOCUMENTS

CA   2929371 A1 *   6/2015   ............ F16L 37/144
DE   2444993 A1      4/1976
(Continued)

*Primary Examiner* — David Bochna
(74) *Attorney, Agent, or Firm* — Eric J. Sosenko; Jonathan P. O'Brien; Honigman LLP

(57) ABSTRACT

A plug connector including a coupling part with a receiving opening into which a plug part, having a plug shaft with a collar, can be inserted. The plug connector also includes a resilient, radially slotted retaining clip having at least two spring arms and which can be pre-assembled on the coupling part and moved radially between an insertion position and a holding position for the plug part. The plug part can be inserted into the receiving opening when the retaining clip is in the insertion position, and when in the holding position he plugged-in plug part, and the collar thereof, can be blocked by the retaining clip against being pulled out. In the insertion position, the retaining clip projects with respect to the outer circumference of the coupling part, and in the holding position the retaining clip is flush with the outer circumference of the coupling part.

22 Claims, 11 Drawing Sheets

(51) Int. Cl.
*F16L 37/088* (2006.01)
*F16L 53/35* (2018.01)
*F16L 25/01* (2006.01)

(58) Field of Classification Search
USPC .......................................... 285/305
See application file for complete search history.

(56) References Cited

U.S. PATENT DOCUMENTS

| | | | | |
|---|---|---|---|---|
| 2005/0236833 A1* | 10/2005 | Poirier | .................. | F16L 37/144 |
| | | | | 285/305 |
| 2006/0267341 A1* | 11/2006 | Takayanagi | ........... | F16L 37/144 |
| | | | | 285/305 |
| 2008/0150280 A1* | 6/2008 | Feger | .................... | F16L 37/144 |
| | | | | 285/326 |
| 2008/0231045 A1* | 9/2008 | Trede | .................... | F16L 37/144 |
| | | | | 285/93 |
| 2010/0290764 A1* | 11/2010 | Borgmeier | ............... | H05B 3/42 |
| | | | | 392/468 |
| 2016/0069496 A1* | 3/2016 | Tayama | .................. | F16L 21/08 |
| | | | | 285/374 |
| 2016/0223116 A1* | 8/2016 | Borgmeier | ............ | F01N 3/2066 |
| 2017/0146173 A1* | 5/2017 | Chaupin | ............. | F16L 37/1225 |

FOREIGN PATENT DOCUMENTS

| | | | |
|---|---|---|---|
| DE | 112008000308 T5 | 12/2009 | |
| DE | 202009012230 U1 | 4/2010 | |
| DE | 102015104889 A1 | 10/2016 | |
| EP | 1158236 A1 | 11/2001 | |
| EP | 2799750 A1 | 11/2014 | |
| FR | 3072756 A1 * | 4/2019 | ............ F16L 37/144 |
| JP | 2007255668 A | 10/2007 | |
| JP | 2014209009 A | 11/2014 | |
| WO | WO-2011105234 A1 * | 9/2011 | .......... F16L 37/0885 |
| WO | 2015/084782 A1 | 6/2015 | |
| WO | WO-2017051684 A1 * | 3/2017 | ............ F16L 37/144 |

\* cited by examiner

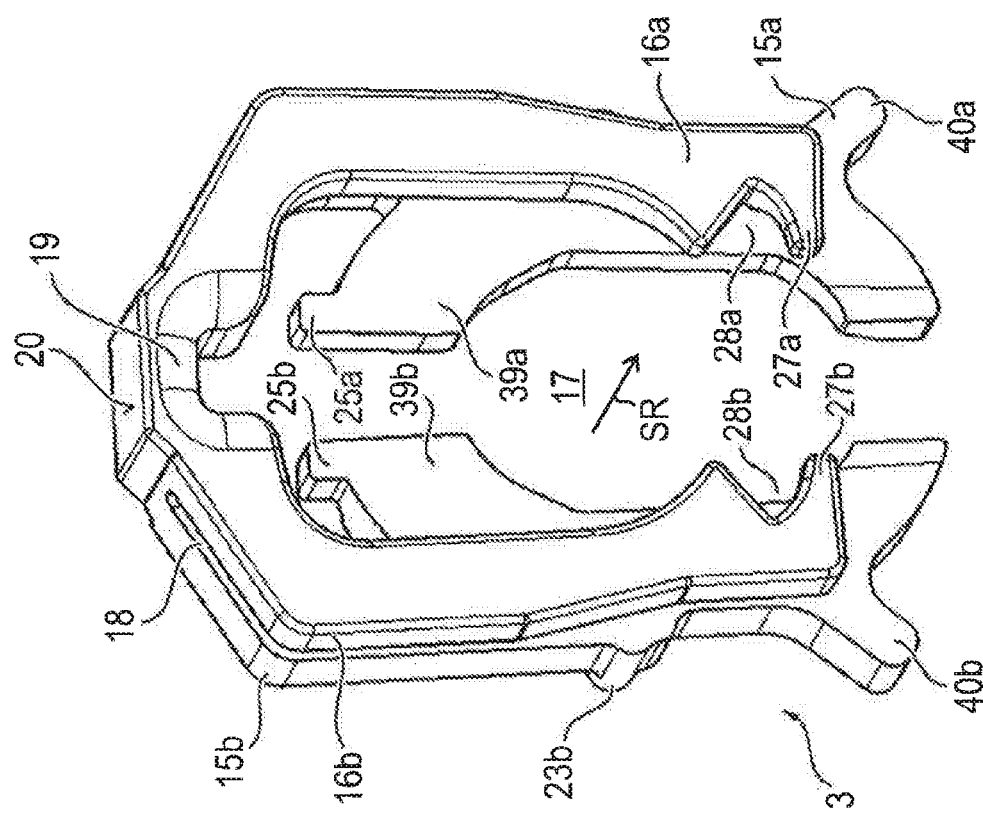
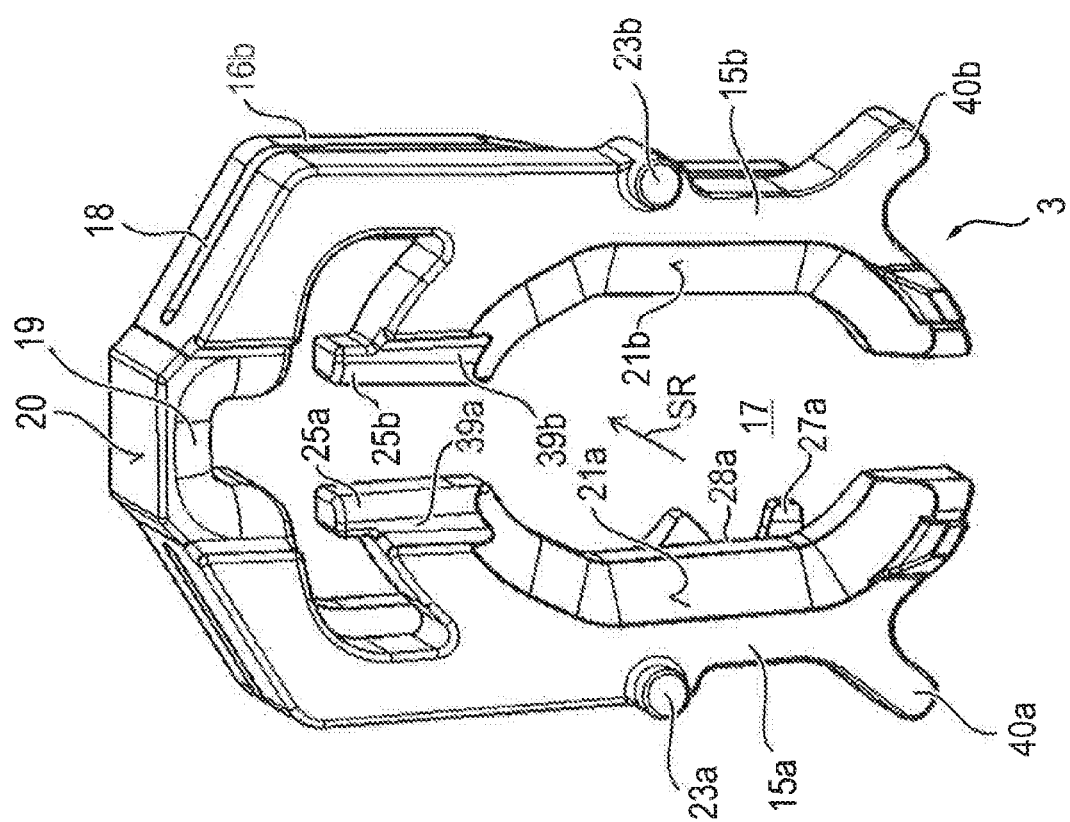

PLUG-IN CONNECTOR FOR MEDIA LINES HAVING INDICATION OF THE PLUGGED-IN STATE

FIELD OF THE INVENTION

The invention relates to a plug-in connector for hose and/or pipe connections, including a coupling part having an outer periphery and having a receiving opening into which a plug part with a plug shaft, which comprises a collar, is insertable in a plug-in direction, and a radially slotted retaining clip, which is resiliently elastic at least in portions, comprising at least two latching arms, being pre-mountable on the coupling part as a result of radially latching the latching arms with the coupling part and being radially movable between an insertion position for the plug part and a retaining position for the plug part, wherein the plug part, in the insertion position, is insertable into the receiving opening through the retaining clip, and wherein the inserted plug part with its collar in the retaining position is blockable against being pulled out in the receiving opening in a positive locking manner by means of the retaining clip.

BACKGROUND

Such a plug-in connector is disclosed, for example, in DE 24 44 993 A1. In this case, the retaining clip is realized as a resilient ring. The ring is interrupted by a radial slot such that two spring arms are formed. The spring arms extend in an outer circular arc which extends over a circular angle which is greater than 180°. The ring is radially latched into a slot-shaped peripheral opening on the coupling part. In this case, peripheral grooves on the outer periphery and on the inner periphery of the coupling part serve for the axial fastening of the ring in the coupling part. The spring arms, in this case, encompass the outer periphery of the coupling part, the peripheral wall of the coupling part between the ring in the interior of the coupling part and the spring arms on the outer periphery of the coupling part being enclosed. Actuating levers, by means of which the ring can be widened over the spring arms in the radial direction and moved into an insertion position, are mounted on each of the free ends of the spring arms. The resilient force of the ring holds the ring in the retaining position. A disadvantage of DE 24 44 993 is, in particular, that the ring cannot be locked in its retaining position. The ring can be opened relatively easily as a result of actuating the actuating elements. This promotes accidental release of the plug-in connection. In addition, it is not possible to ensure with the system whether the plug part is completely plugged into the plug-in connector. i.e. secure against being pulled out, and is correctly blocked. The retaining clip can also be moved into the retaining position when the plug part is only partially plugged in or is not plugged in at all and is consequently not held correctly in the plug-in connector by the retaining clip.

Furthermore, straight and angled generic plug-in connectors which are found commercially under the name "VOSS quick connect system 241" are known. The connection is initially produced by plugging together the coupling part and the plug part, in particular a male plug realized according to standard SAE J 2044. In this case, the retaining clip engages behind the collar which is realized in the SAE plug contour. The formation of the plug-in connection is then completed by pulling back the plug part. The named quick connect system is used in automobile construction, in particular in fuel systems and in heated and non-heated SCR systems. SCR, in this case, stands for "selective catalytic reduction" and designates a technique for reducing nitrogen oxide in exhaust gases. The SCR method has been used in automotive engineering since its introduction in 2004 in order to lower the nitrogen oxide emissions in diesel vehicles. Using this technology, commercial vehicles are able to meet the Euro 5 emissions standard and passenger vehicles are able to meet the very strict American BIN5 standard and the Euro 6 standard. As a rule, a 32.5 percent aqueous urea solution, which is uniformly designated in the industry as AdBlue, is run in the lines of SCR systems. The composition is controlled in DIN 70070 or ISO 22241-1. The aqueous solution is injected into the exhaust gas system upstream of the SCR catalytic converter, e.g. by means of a dosing pump or injector.

The plug-in connectors of the known system appear in need of improvement on the basis of the same criteria as the plug-in connector according to DE 24 44 993 A1, i.e. the retaining clip can also be moved into the retaining position when the plug part is only partially plugged in or is not plugged in at all and is consequently not held correctly in the plug-in connector by the retaining clip.

In order to remedy this, German patent application 10 2015 104 889 has already proposed arranging a separate locking element on the coupling part which is movable in the direction of the center axis of the plug-in connector transversely to the insertion direction of the plug part from a release position into a locking position and in the release position releases a movement of the retaining clip from the retaining position into the insertion position and in the locking position locks the retaining clip in the retaining position against a movement into the insertion position. In this connection, the increased assembly safety is bought by an increase in the number of components, which is not necessarily to be seen as advantageous.

SUMMARY

The object underlying the invention is to provide a plug-in connector of the type mentioned in the introduction, where the retaining clip can be locked in the retaining position against accidental release and additionally the correct and complete insertion of a plug part into the plug-in connector is able to be checked without additional components being required to do this.

The object is achieved by providing a retaining clip held in an insertion position in such a manner that the retaining clip protrudes in relation to the outer periphery of the coupling part, and in a retaining position, the retaining clip is held in such a manner that it closes off flush with the outer periphery of the coupling part.

On the one hand, according to the invention, the retaining clip, as a result, advantageously fulfills the function of a plugged-in indicator, by means of which it can be detected whether the plug part is correctly plugged-in or not, and on the other hand, accidental release of the retaining clip is advantageously prevented as a result of the locking process. Only when the plug part is inserted completely into the coupling part, in particular with the collar of the plug part latched with the retaining clip, can the retaining clip be moved into the retaining position, which then represents the final assembly position, and which indicates, as a result, that the retaining clip closes off flush with the outer periphery of the coupling part. As a result of the indication of the plugged-in state, it is then immediately detectable that the plug-in connector according to the invention is plugged in correctly.

An additional locking part, in this case, is not necessary. The entire retaining clip can be realized in one piece in a realization that is simple to manufacture, in particular advantageously as an injection molded part consisting of plastics material.

The retaining clip can be realized similarly to the ring disclosed in the prior art, by the basic shape of the retaining clip—when viewed in the direction of the longitudinal axis—being realized, in particular, in a U-shaped manner, wherein the legs of the U-shape, however, in contrast to the prior art, do not realize just one but two pairs of spring arms which are located diametrically opposite one another, i.e. a total of four, instead of two, spring arms. The pairs of spring arms are arranged, in this case, one behind the other in the axial direction and the spring arms which are located axially one behind the other are separated in each case by a slot. As a result, the spring arms which are located one behind another are able to be pressed together in the axial direction during the pre-assembly of the retaining clip and also for disassembly.

The pairs of spring arms which are located one behind the other fulfill different functions in this case. The pair which faces the insertion direction of the plug part in the axial direction serves predominantly for fulfilling the main function of producing a connection, that is to say as latching arms for the radial latching of the plug part, whilst the pair which faces away from the insertion direction of the plug part in the axial direction serves for fulfilling the secondary functions according to the invention of indication of the plugged-in state and of the locking of the retaining clip in its insertion position and in its retaining position. However, the pair of spring arms which faces the insertion direction of the plug part in the axial direction also contributes to fulfilling the secondary functions according to the invention, as is described in more detail below.

The coupling part can include a basic body, which is realized, in particular, as a sleeve part, and a receiving body for the retaining clip, the basic shape of which is, in particular, a ring, which basic body and receiving body are connectable together, preferably via a substance-to-substance bond, such as by laser welding, or are connected together in the assembled state. As the retaining clip, the coupling part or its parts can also be realized in a realization that is simple to manufacture as injection molded parts consisting of plastics material.

A sealing package, which preferably includes two sealing rings, in particular elastomer O-rings, and a spacer ring arranged in between, can be arranged in the coupling part, in particular in the basic body thereof.

In the system named in the introduction, high demands produced from the loading conditions are made, in particular, on the heatable fluid lines. The demands relate, in particular, to the possible occurrence of high temperatures which at certain points of the system or of the lines can be, for example, within the range of between 140° C. and 180° C., in the short term even within the range of up to 200° C. Furthermore, with this occurrence high absolute pressures are expected which are within the range of between 5 bar and 10 bar as standard, sometimes even within the range of up to 15 bar. Pressure pulses can occur which have to be compensated for, as well as also volume changes which are linked, for example, to freezing in the event of frost and to the re-thawing of the fluid. A plug-in connector according to the invention copes with these requirements.

In order to enable heating, the basic body of the coupling part, in this case, is realized as a connector part, which comprises a connection portion for the connection to a fluid line and which comprises a heating portion, in which electric heating media can be provided in an arrangement which surrounds the coupling part at least in part. The electric heating media, in particular heating conductors, can be mounted, in this case, on the outside of the coupling part, for which purpose guide elements, in particular helical guide elements, can be arranged or realized on the outer periphery of the coupling part.

In a preferred realization, the coupling part can, in particular by means of its receiving body for the retaining clip, form a housing for the retaining clip which is hollow cylindrical in its basic shape, is closed in each case at the respective end walls of the hollow cylinder and comprises on two sides, which are diametrically opposite one another, peripheral openings for the through-passage of the retaining clip. In the assembled state, the retaining clip, as a result, is advantageously enclosed by the housing at least in regions both in an axial and also in a radial direction and is consequently protected against external influences and advantageously also secured against the possibility of a spontaneous opening. The peripheral openings in the coupling part, however, ensure the retaining clip can be assembled and disassembled by allowing or enabling guided radial displaceability of the retaining clip. The opening, on the side on which the retaining clip can be inserted, is subsequently designated as an insertion opening and the opening on the other side is designated as an outlet opening, notwithstanding that the retaining clip does not exit fully through the opening. It is, however, freely accessible on the side—for example for a manual release operation.

The plug-in connector according to the invention can advantageously be delivered in a pre-assembled state, in which the retaining clip is already mounted on the coupling part and in the receiving opening as a result of radial latching, and which represents the insertion position for the plug part. The pre-assembled state, in this case, is indicated as a result of the retaining clip protruding relative to the outer periphery of the coupling part. For each of the two significant positions of the retaining clip—insertion position and retaining position—there is consequently an indication of the plugged-in state.

In a preferred realization of the invention, guide slots for the engagement or for the abutment of complementary guide pins which are situated on spring arms of the retaining clip can be situated in the coupling part in its end wall that faces the insertion direction of the plug part. Accordingly, in the preferred realization, guide pins for engagement in the guide slots of the coupling part can be situated on each of the spring arms of the spring arm pair which faces the end wall in the insertion position and in the retaining position of the retaining clip, in particular in a central region. The end wall facing the insertion direction of the plug part is also designated subsequently as the front end wall and the spring arm pair facing the end wall is designated as the front pair, whilst the end wall of the receiving body for the retaining clip that faces away from the insertion direction of the plug part is also designated subsequently as the rear end wall and the spring arm pair facing the end wall is designated as the rear pair.

It is also preferred when longitudinal guide webs or longitudinal guide steps, which are directed in a secant-like manner, for interaction, in particular for engagement in or for abutment against complementary guides of the coupling part, are situated on each of the spring arms which, in the insertion position and in the retaining position of the retaining clip, face the end wall of the coupling part, which faces the insertion direction of the plug part. Accordingly, guides for the guide webs or guide steps, which are located on the spring arms of the retaining clip, are provided on the coupling part, in particular on the inside on its front end wall which faces the insertion direction of the plug part. The longitudinal guide webs or longitudinal guide steps of the spring arms can be situated, in particular, on both sides of a connecting region or in a connecting region in which the spring arms are connected together or, as an alternative to this, can be arranged on radially inwardly directed projections of the spring arms.

As a result of the guide pins of the retaining clip which are located in the slot guide contour of the coupling part, in particular in the retaining clip receiving means thereof formed by the receiving body, and of the longitudinal guide webs of the retaining clip which project into the longitudinal guide region of the retaining clip receiving means, the retaining clip is advantageously guided during the entire assembly movement sequence in the plug-in connector according to the invention and secured against rotation about the plug part plug-in axis.

In a preferred manner, in this case, a control contour can be realized in each of the guide slots, by means of which control contour, in cooperation with the complementary guide pins, on the one hand, an insertion movement and an extension movement of the retaining clip transversely to the plug-in direction of the plug part can be delimited, and, on the other hand, when the retaining clip is moved transversely to the plug-in direction of the plug part, the spring arms, on which the guide pins are situated, are caused to move radially outward or radially inward.

Furthermore, in an advantageous realization of the plug-in connector according to the invention, it can be provided that inclined surfaces, which diverge in opposition to the insertion direction of the plug part for interaction with the collar of the plug part, are situated on each of the spring arms of the front pair of spring arms, which pair, in the insertion position and in the retaining position of the retaining clip, faces an end wall of the coupling part, which faces the insertion direction of the plug part.

When the plug-in part is plugged in, the plug part collar initially contacts the inclined surfaces of the spring arms of the retaining clip which are preferably formed from chamfered regions, wherein then as a result of the collar sliding along the inclined surfaces, the retaining clip is widened radially—that is to say the spring arms of a pair are widened outward relative one another—and also axially—that is to say the spring arms, which are each located one behind the other, of the two pairs are widened away from one another in the axial direction—and the plug part is able to latch behind the front spring arms which comprise the inclined surfaces. The spring arms then spring radially inward again and in this way pass into their starting position. The axial widening, which is connected to the position of the collar of the plug part between the spring arm pairs located axially one behind the other, stabilizes the position of the retaining clip in the coupling part and holds the guide pins in the guide slots of the coupling part.

In addition, in an advantageous realization of the plug-in connector according to the invention, it can be provided that in each case inclined surfaces, which diverge in opposition to the insertion direction of the plug part for interaction with the collar of the plug part, can also be situated on the spring arms of the rear pair of spring arms, that is to say on the spring arms of a pair of spring arms which faces away from the front end wall of the coupling part, in a region of the free ends of the spring arms. When the plug-in operation of the plug part has been carried out and the plug part collar is latched behind the front spring arms, the collar, as a result of a further movement in the axial direction over the inclined surfaces on the rear spring arms, is able to widen the rear spring arms in a radial manner.

Cams with tips which are directed inwardly toward one another are situated on each of the free ends of the rear spring arms. The cams, in the insertion position of the retaining clip when the plug part is not yet plugged-in, can bear against a counter contour of the coupling part which is situated in the coupling part, in particular against a blocking element which is arranged in the middle of the region of the outlet opening in the receiving body of the coupling part. As a result of the abutment of the cams against the counter contour, in the insertion position the retaining clip, when being pushed in, is prevented from being pushed out again radially on the other side out of the coupling part. When the collar, as a result of its further movement in the axial direction over the inclined surfaces of the rear spring arms, presses the rear spring arms apart, they can be deflected radially by such an amount that they are able to slide past on both sides of the blocking element. Pushing the retaining clip out of the coupling part on the side located opposite the insertion opening is nevertheless impossible as this is prevented by the plug part which is located in the coupling part.

In addition, grooves with openings, which are directed inwardly toward one another and are intended for interaction with complementary retaining contours of the coupling part, can be situated in a region of the free ends of the spring arms, in particular directly next to or in the end cams. The retaining contours, together with the grooves, form releasable blocking means which block a movement of the retaining clip when the final assembly position of the plug-in connector according to the invention is present, that is to say when the retaining clip is situated in its retaining position. The retaining contours can advantageously also be realized on the blocking element, on both sides thereof as retaining projections. As a result of the retaining projections engaging in the grooves, the movement possible beforehand transversely to the insertion direction of the plug part is prevented in a non-positive and positive locking manner. Consequently, the retaining clip is held locked in the retaining position, it being dimensioned with reference to its length in such a manner that it closes off flush with the outer periphery of the coupling part. In particular, the diameter of the receiving body of the coupling part is the same size as the axial length of the retaining clip.

In further advantageous realizations of a plug-in connector according to the invention, a pressure locking system can be provided which prevents the plug-in connector according to the invention—when the plug part is plugged in and it is under pressure—from being able to be opened or which can prevent—as a result of whatever kind of abovementioned operating loads—the plug part being twisted out of its retaining position.

A secondary locking system against release of the plug-in part can also be provided in a realization variant of the retaining clip.

Further advantageous configurations of the invention will be recognized from the following description of the figures and the appended claims.

BRIEF DESCRIPTION OF THE DRAWINGS

The figures are as follows.

In the various figures of the drawing, identical parts are always provided with the same reference symbols and are consequently, as a rule, only described once below. In terms of better clarity, however, all parts are not designated with their reference symbols in all the figures of the drawing.

DETAILED DESCRIPTION

It is claimed regarding the following description that the invention is not restricted to the exemplary embodiments and, in this case, not to all or multiple features of described feature combinations, rather each individual part feature of the/each exemplary embodiment, also detached from all other part features described in conjunction therewith, is important to the object of the invention in itself and also in combination with arbitrary features of a different exemplary embodiment.

Figure 1:
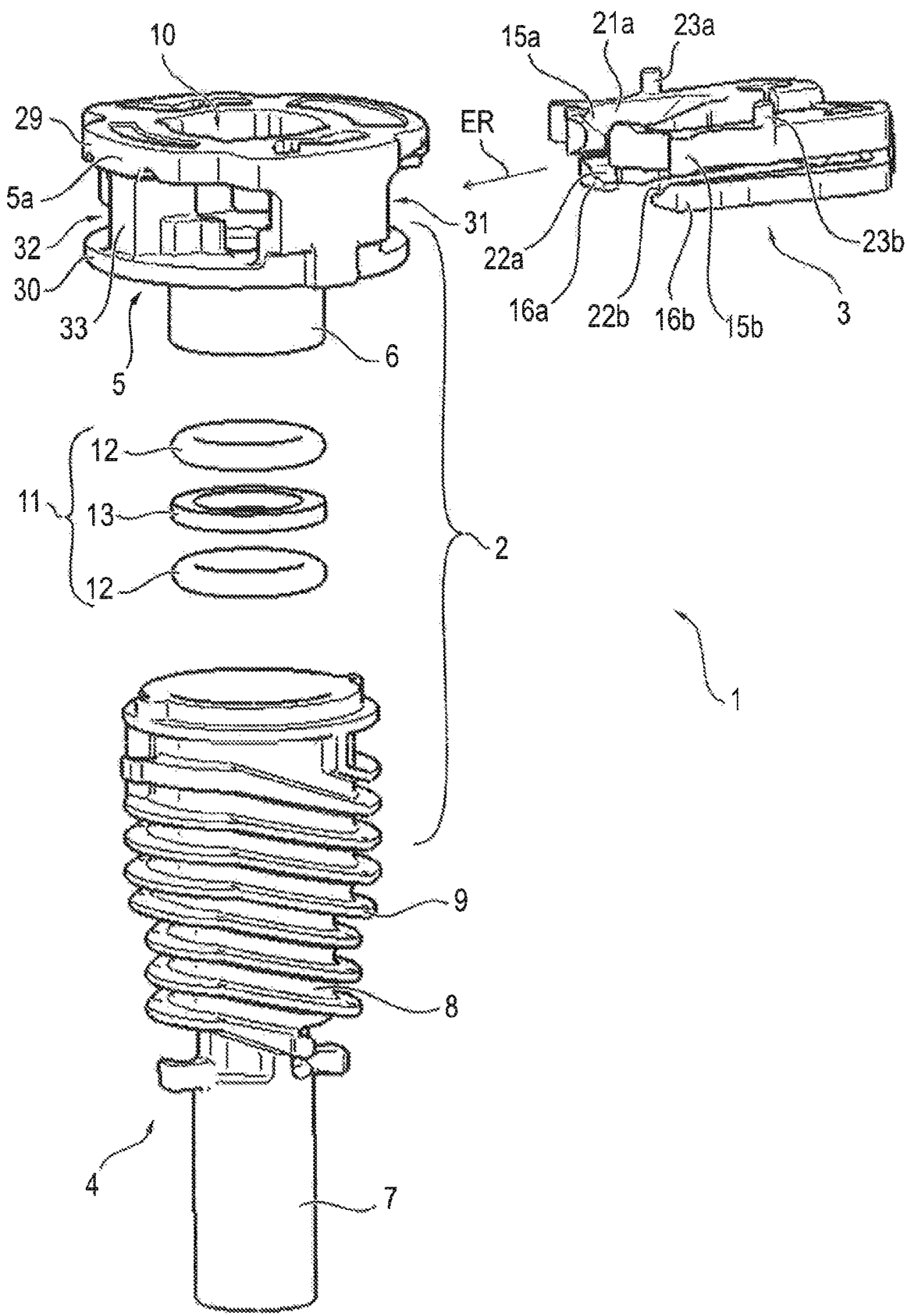
FIG. 1 shows a three-dimensional exploded representation of an embodiment of a plug-in connector according to the invention.

FIG. 1 shows an exploded representation of an advantageous embodiment of a plug-in connector 1 according to the invention for the connection of a plug part S which is realized as a pipe socket, in particular an SAE J 2044 male plug. Such a plug S is shown initially in FIGS. 2 and 3a to 3c.

The plug-in connector 1 includes a coupling part 2 and a resilient, at least in portions, retaining clip 3.

The coupling part 2 has a basic body 4, which is realized, in particular, as a sleeve part, and a receiving body 5 for the retaining clip 3 in the basic shape, in particular, of a ring, which basic body and receiving body are connected together, preferably by means of a substance-to-substance bond, such as by laser welding. A connection shoulder 6 is provided for this purpose on the receiving body 5. The basic body 4 and/or the receiving body 5 can be advantageously realized as injection molded parts consisting of plastics material. The receiving body 5 is shown as an individual part in FIGS. 6a and 6b from various viewing angles each in a three-dimensional representation.

The coupling part 2 can be connected at one end, in particular, to a fluid line (not shown). For this purpose, a connection portion 7 is realized on the basic body 4. A media line to be connected can be realized, in particular, as a hose or pipe.

The basic body 4 of the coupling part 3, in this case, in order to enable heating, is realized as a connector part which comprises the connection portion 7 for the connection of the fluid line and a heating portion 8, in which electric heating media—not shown—can be provided in an arrangement which surrounds the coupling part 2 at least in part. The electric heating media, in particular heating conductors, can be fitted, in this case, on the outside of the coupling part 2, for which reason guide elements 9, in particular helical guide elements 9, are arranged or realized on the shell in the region of the heating portion 8 of the coupling part 2.

On the side located opposite the connection portion 7 for the media line, the coupling part 2 comprises a receiving opening 10 for plugging-in the plug part S.

For sealing the plug-in connection, a sealing package 11 is arranged in the coupling part 2, in the basic body 4 thereof. The sealing package 11 preferably includes two O-rings 12 and a spacer ring 13 located in between.

Figure 2:
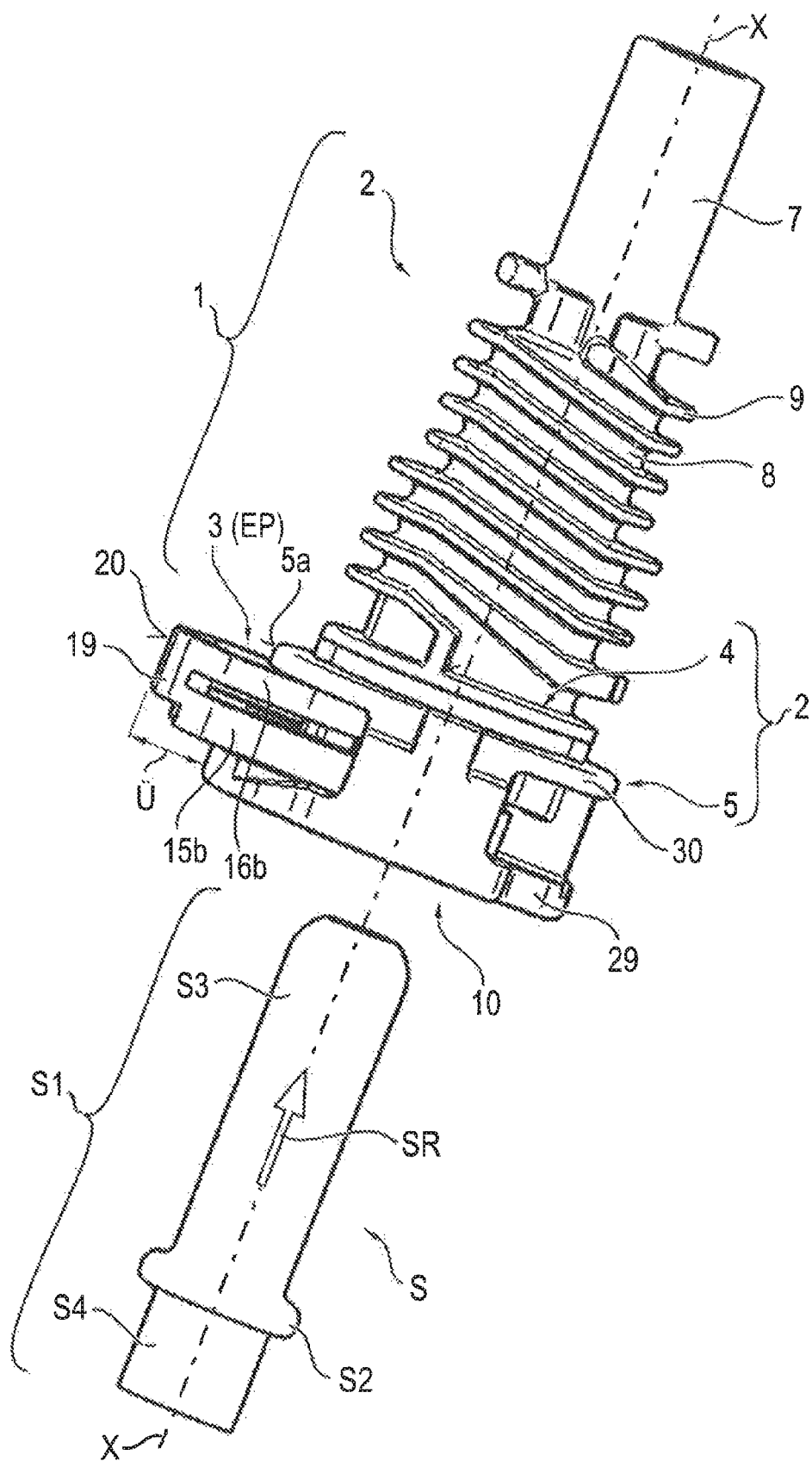
FIG. 2 shows a three-dimensional representation of the embodiment shown in FIG. 1 of a plug-in connector according to the invention in the pre-assembled state with a plug part to be inserted.
Figure 3A:
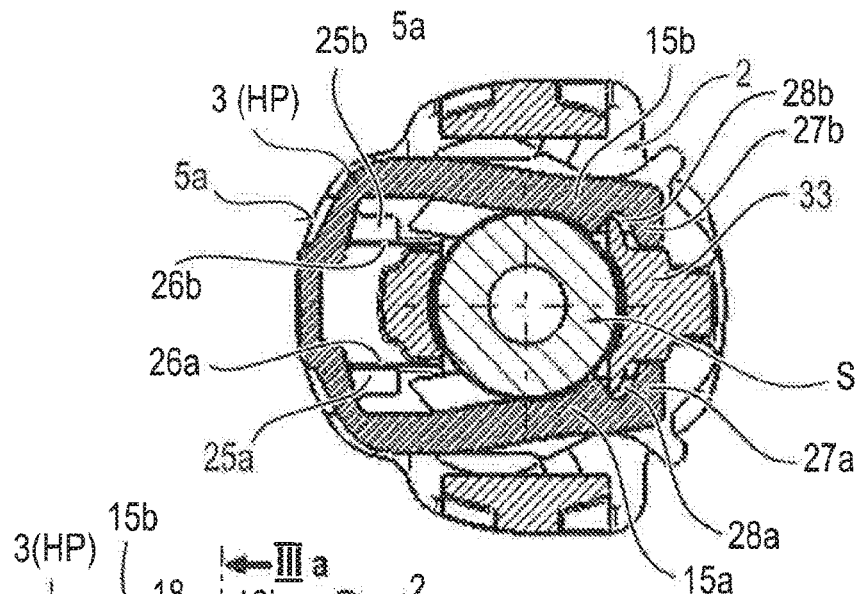
FIGS. 3a, 3b, 3c show a radial section, an axial section and a view of the end face of representations of the embodiment shown in FIGS. 1 and 2 of a plug-in connector according to the invention in the final assembly state with the plug part inserted.
Figure 3B:
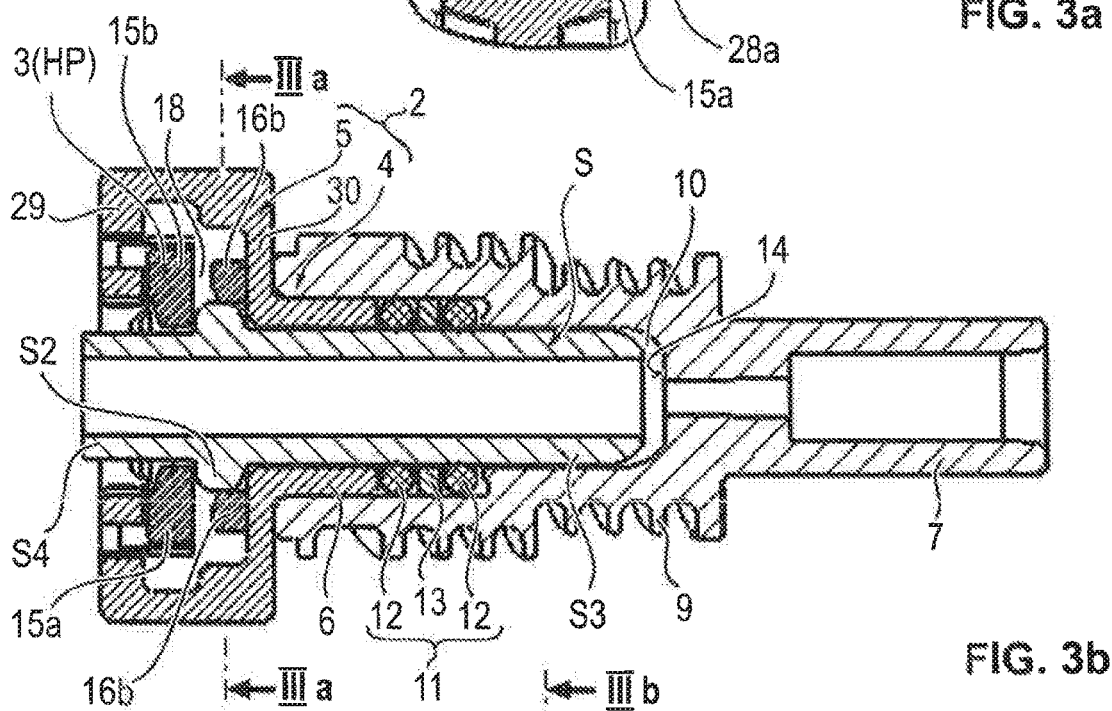
Figure 3C:
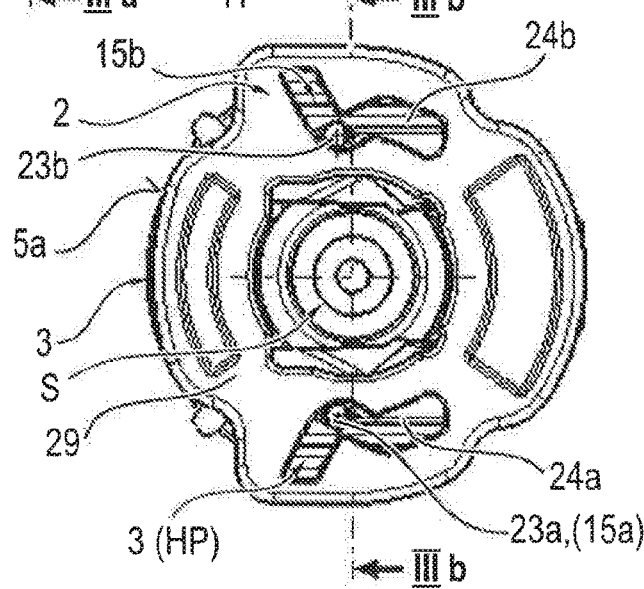

As FIG. 2 and also FIGS. 3a to 3c show in particular, the plug part S comprises an insertion portion S1, on the outer periphery of which a peripheral collar S2 is arranged. The plug part S is realized in a hollow cylindrical manner. The collar S2 divides the insertion portion S1 into a sealing portion S3 and a locking portion S4, the sealing portion S3 being arranged axially (longitudinal axis X-X) before the locking portion S4 in the insertion direction SR. Once the plug S has been plugged-in, the sealing package 11 rests on the sealing portion S3, as is shown, for example, in FIG. 3b.

The retaining clip 3 is pre-assemblable on the coupling part 2 as a result of latching and is radially movable between an insertion position EP (FIG. 2) for the plug part S and a retaining position HP (FIGS. 3a to 3c) for the plug part S. In the insertion position shown in FIG. 2, the plug part S is insertable into the receiving opening through the retaining clip 3, and in the retaining position the inserted plug part S with its collar S2 is blockable against being pulled out in the receiving opening 10 in a positive locking manner by means of the retaining clip 3, as shown in FIGS. 3a to 3c, in particular FIG. 3b. The inner periphery of the receiving opening 10 of the coupling part 2 is advantageously realized in such a manner that, with the plug part S completely and correctly plugged-in in the receiving opening 10 (FIGS. 3a to 3c), the coupling part 2 forms a sealing connection to the plug part S. The sealing package 11 serves, in this case, for total sealing. The receiving opening 10 is delimited at its rear end in the insertion direction SR in the basic body 4 by a ring wall 14 which forms a through-opening for the fluid.

It is provided according to the invention that the retaining clip 3 is held locked in the insertion position EP (FIG. 2) in such a manner that the retaining clip 3 protrudes in relation to an outer periphery 15 of the coupling part 2 and that the retaining clip 3 is held locked in the retaining position HP (FIGS. 3a to 3c) in such a manner that the retaining clip 3 closes off flush with the outer periphery 15 of the coupling part 2. The protrusion is characterized in FIG. 2 with the reference symbol Ü and the flush closure can be seen, in particular, in FIGS. 3a and 3c. How the locking is effected in this case in each of the two positions EP, HP is described in more detail below.

A first preferred embodiment of a retaining clip 3 for a plug-in connector 1 according to the invention is described below by way of the three-dimensional representation in FIG. 4 and the representations of the four main views in FIGS. 5a, 5b, 5c, 5d.

The retaining clip 3 can be realized preferably—as shown—in one piece, in particular as an injection molded part consisting of plastics material.

Figure 5A:
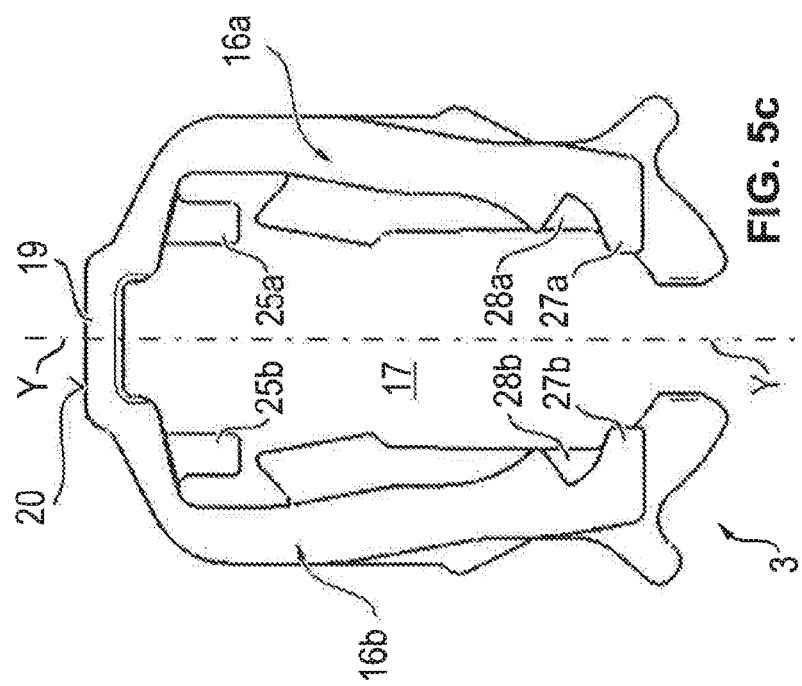
FIGS. 5a, 5b, 5c, 5d show the four main views, front view, side view, rear view and top view, of the realization of a retaining clip shown in FIG. 4 for the embodiment shown in FIG. 1 of a plug-in connector according to the invention.
Figure 5B:
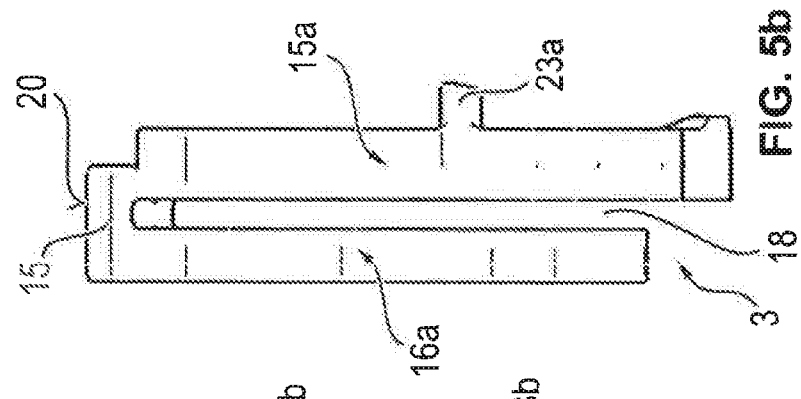
Figure 5C:
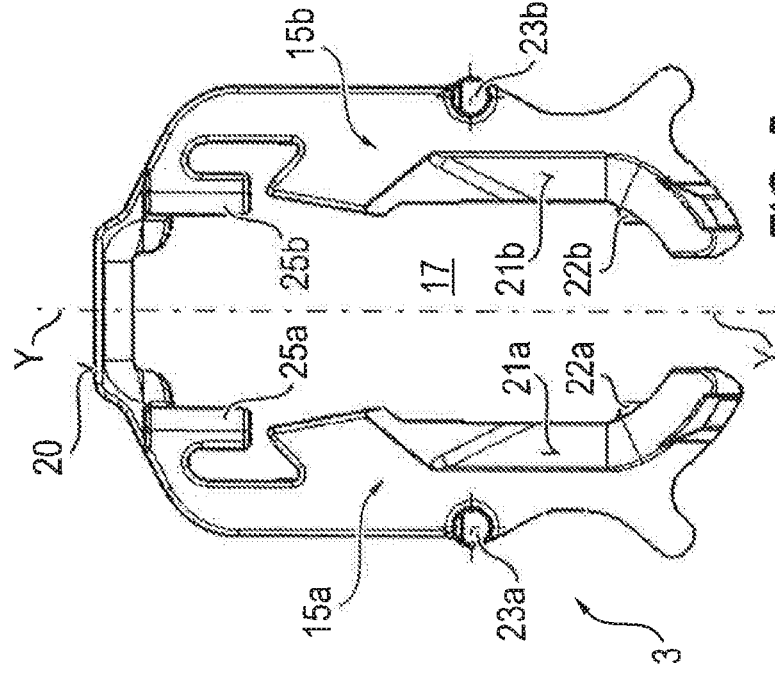

The retaining clip 3, in this case, is realized in a U-shaped manner, in particular in its basic shape—when viewed in the direction of the longitudinal axis X-X of the plug-in connector 1, that is to say in its front view shown in FIG. 5a and its rear view shown in FIG. 5c, the legs of the U realizing two pairs 15a/15b, 16a/16b of spring arms 15a, 15b, 16a, 16b which are situated diametrically opposite one another. The spring arms 15a, 15b, 16a, 16b form resilient regions of the retaining clip 3. The legs of the U, in this case, are separated by a radial slot 17.

Figure 5D:
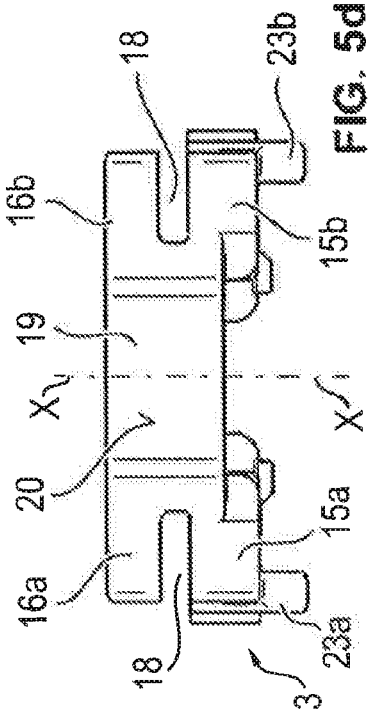

The pairs 15a/15b, 16a/16b of spring arms 15a, 15b, 16a, 16b are arranged one behind the other in the axial direction X-X and are also separated from one another by a slot 18, however an axial slot 18 (see FIGS. 5b and 5d in particular in this respect). The retaining clip, in this case, is realized symmetrically with regard to a longitudinal axis Y-Y (FIG. 5a, 5c) which extends through it.

An actuating surface 20 for the retaining clip 3 is realized by the connecting region 19 of the legs of the U on the side that faces away from the free ends of the spring arms 15a, 15b, 16a, 16b, by means of which actuating surface the retaining clip 3 is able to be pushed manually into the coupling part 2.

The front pair 15a/15b, which faces the insertion direction SR of the plug part 1 in the axial direction X-X, serves predominantly for fulfilling the main function of producing the connection, therefore holding the latching arms 15a, 15b ready for the radial latching of the plug part 1, whilst the rear pair 16a/16b, which faces away from the insertion direction SR of the plug part S in the axial direction X-X, serves for fulfilling the secondary functions according to the invention of indicating the plug-in state and of locking the retaining clip 3 in its insertion position EP and in its retaining position HP.

Inclined surfaces 21a, 21b (FIGS. 4, 5a), which diverge in opposition to the insertion direction SR of the plug part S for interaction with the collar S2 of the plug part S, are situated on each of the spring arms 15a, 15b of the front pair 15a/15b, in particular at least in a central region of the spring arms 15a, 15b.

Inclined surfaces 22a, 22b (FIGS. 1, 4, 5a), which diverge in opposition to the insertion direction SR of the plug part S for interaction with the collar S2 of the plug part S, are also situated on the spring arms 16a, 16b of the rear pair 16a/16b, in particular in a region of the free ends of the spring arms 16a, 16b.

Furthermore, it is provided that guide pins 23a, 23b for engagement in complementary guide slots 24a, 24b of the coupling part 2 (FIG. 3c) are situated on each of the spring arms 15a, 15b of the front pair 15a/15b of spring arms 15a, 15b, in particular in a central region of the spring arms 15a, 15b.

In addition, it can be seen, in particular, from FIGS. 3a, and 4, 5a and 5c that longitudinal guide webs 25a, 25b which are directed in a secant-like manner to the coupling part, for interaction with complementary guides 26a, 26b of the coupling part 2 (FIG. 3a), can be situated on each of the spring arms 15a, 15b of a front pair 15a/15b of spring arms 15a, 15b, in particular on both sides of the connecting region 19 or also in the connecting region 19 in which the spring arms 15a, 15b, 16a, 16b are connected together.

Figure 4:
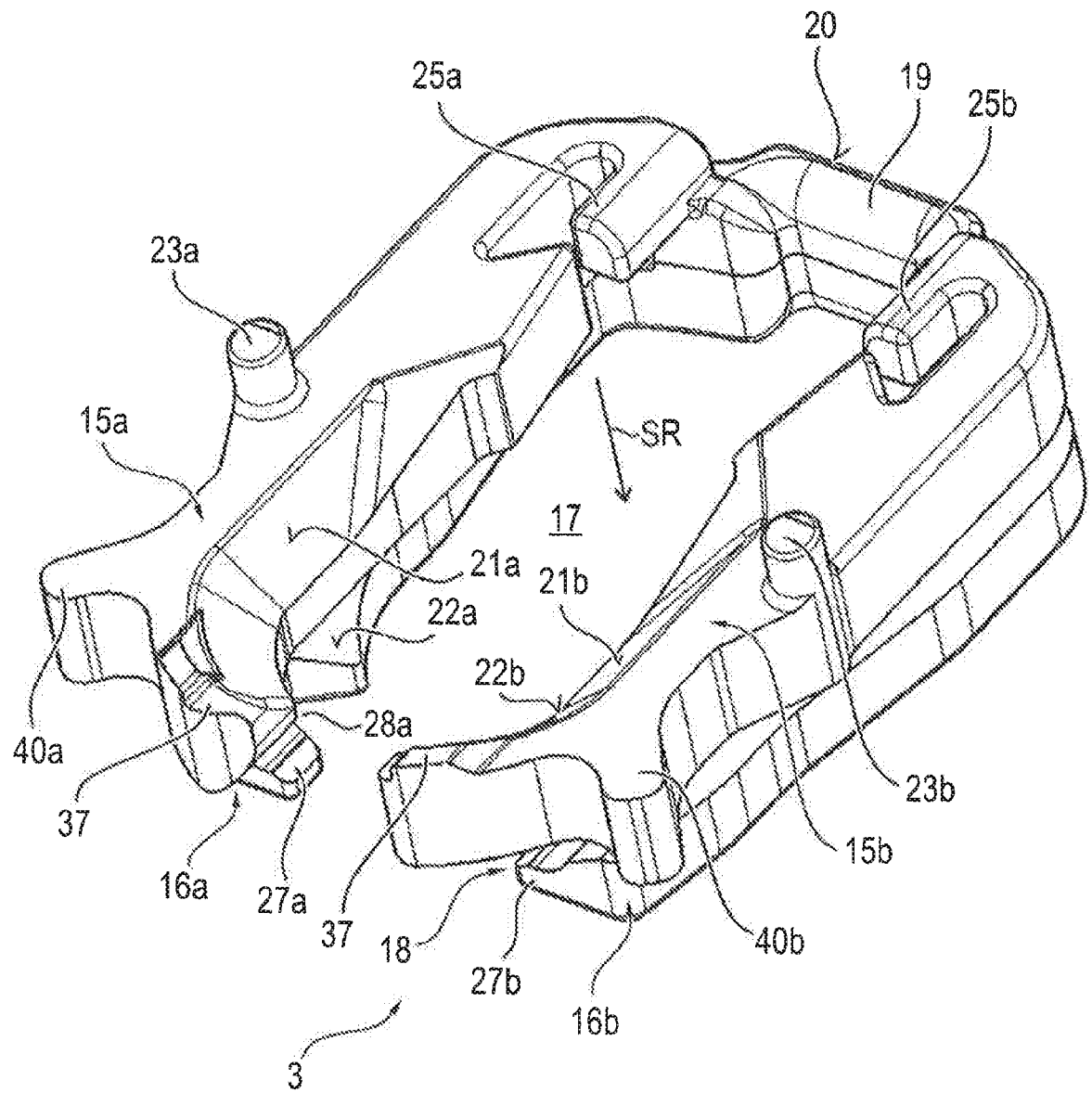
FIG. 4 shows a three-dimensional representation of a first realization of a retaining clip for the embodiment shown in FIG. 1 of a plug-in connector according to the invention.

Furthermore, it is clear from FIGS. 3a, 4 and 5c that cams 27a, 27b with tips which are directed inward toward one another are realized in each case on the free ends on the spring arms 16a, 16b of the rear pair 16a/16b of spring arms 16a, 16b which faces away from the insertion direction of the plug part S.

Grooves 28a, 28b with openings which are directed inward toward one another for interaction with complementary retaining contours of the coupling part 2 are situated in—or depending on the method of looking at the size of the cams 27a, 27b directly next to—the end cams 27a, 27b.

Figure 6A:
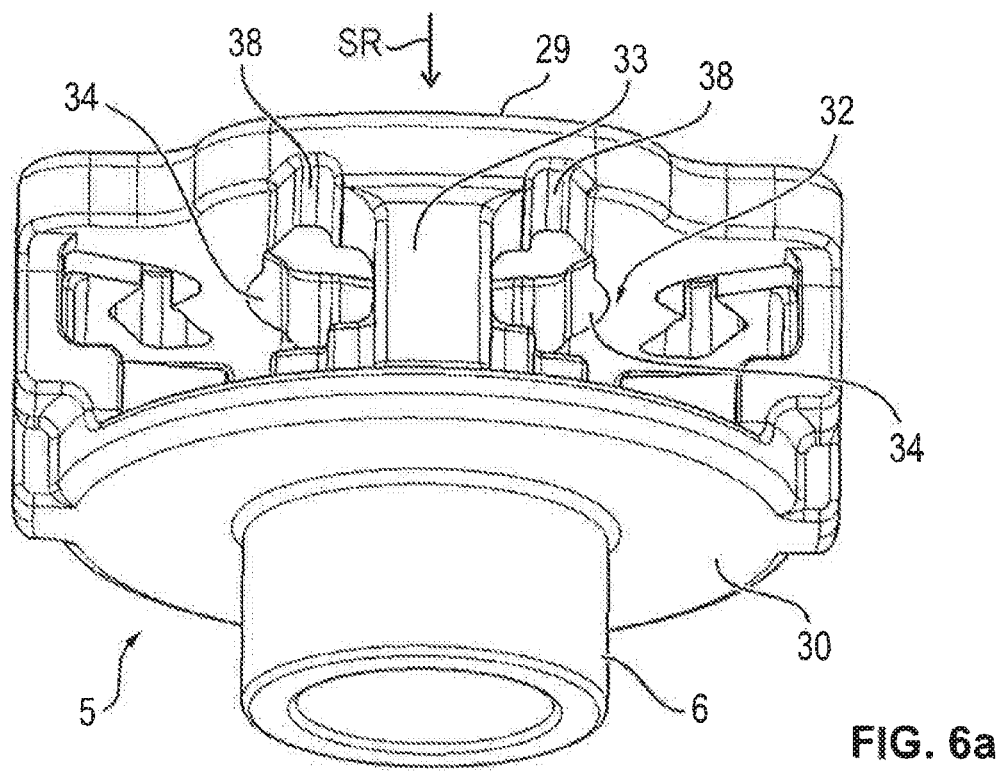
FIGS. 6a and 6b show, from various viewing angles, two three-dimensional representations of a receiving body of a coupling part for a retaining clip of the embodiment shown in FIG. 1 of a plug-in connector according to the invention.
Figure 6B:
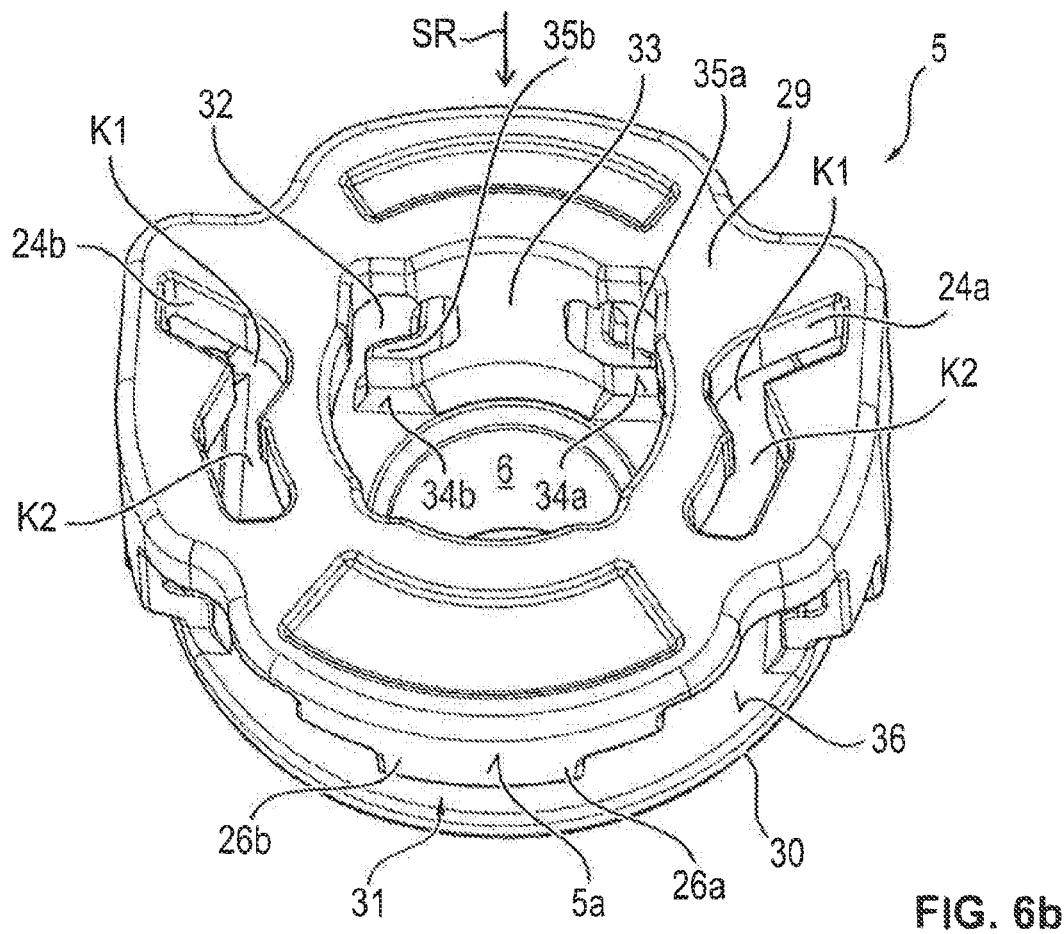

As the detailed representations of the receiving body 5 of the coupling part 2 illustrate in FIGS. 6a and 6b as an example, the coupling part 2, in particular by its receiving body 5 for the retaining clip 3, forms a housing for the retaining clip 3 which is hollow cylindrical in its basic shape and is closed at the respective end walls 29, 30 of the hollow cylinder. In this case, it comprises, on two sides which are diametrically opposite one another, peripheral openings 31, 32 for the through-passage of the retaining clip 3, in particular an insertion opening 31 (FIG. 6b) and an outlet opening 32 (FIG. 6a).

The guide slots 24a, 24b, which have already been mentioned with reference to FIG. 3c, can be seen clearly in FIG. 6b. Guide slots 24a, 24b for the engagement of complementary guide pins 23a, 23b, which are located on the front spring arms 15a, 15b of the retaining clip 3, are situated in the coupling part 2, in particular in the receiving body 5 thereof for the retaining clip 3, on the end wall 29 of the coupling part 2 facing the insertion direction of the plug part S. The guide slots 24a, 24b are in each case elongated holes with two obtuse bend angles K1, K2 which are located one behind the other in the insertion direction ER of the retaining clip 3, the vertices of which—located in the middle of the slots 24a, 24b—, to which the reference lines run in the figures, are rounded. The basic form of the guide slots 24a, 24b, in this case, can also be characterized by the form of a stylized lightening flash.

As a result, a control contour is realized in each case in the guide slots 24a, 24b, by means of which control contour, interacting with the complementary guide pins 23a, 23b, on the one hand, an insertion movement of the retaining clip 3 in the insertion direction ER and an extension movement in opposition to the insertion direction ER transversely to the plug-in direction SR of the plug part S is delimited, and on the other hand, in the case of a movement of the retaining clip 3 transversely to the plug-in direction SR of the plug part S, the spring arms 15a, 15b, on which the guide pins 23a, 23b are situated, are caused to move radially outward or radially inward.

The guides 26a, 26b, already mentioned with reference to FIG. 3a, which are situated in the coupling part 2, in particular in the receiving body 5 thereof for the retaining clip 3, in particular on the inside of the end wall 29 of the coupling part 2 facing the insertion direction SR of the plug part S, for the complementary guide webs 25a, 25b or guide steps located on the spring arms 15a, 15b of the retaining clip 3, can also be found in FIG. 6b.

Furthermore, the two FIGS. 6a and 6b show that a blocking element 33, with in each case a counter contour 34a, 34b for the abutment of the cams 27a, 27b arranged at the ends of the spring arms 16a, 16b, and with releasable blocking means 35a, 35b, is situated in the coupling part 2, in particular in the middle of the region of the outlet opening 32 of the receiving body 5 of the coupling part 2, the releasable blocking means 35a, 35b being able to realize a non-positive and a positive locking connection to the grooves 28a, 28b located in the rear spring arms 16a, 16b of the retaining clip 3 as complementary blocking means.

For assembling the plug-in connector 1 according to the invention, first of all according to FIG. 1 the sealing package 11 and then the receiving body 5 is inserted into the basic body 4 of the coupling part 2. Then the basic body 4 and the receiving body 5 are connected together—e.g. by means of laser welding.

Figure 7:
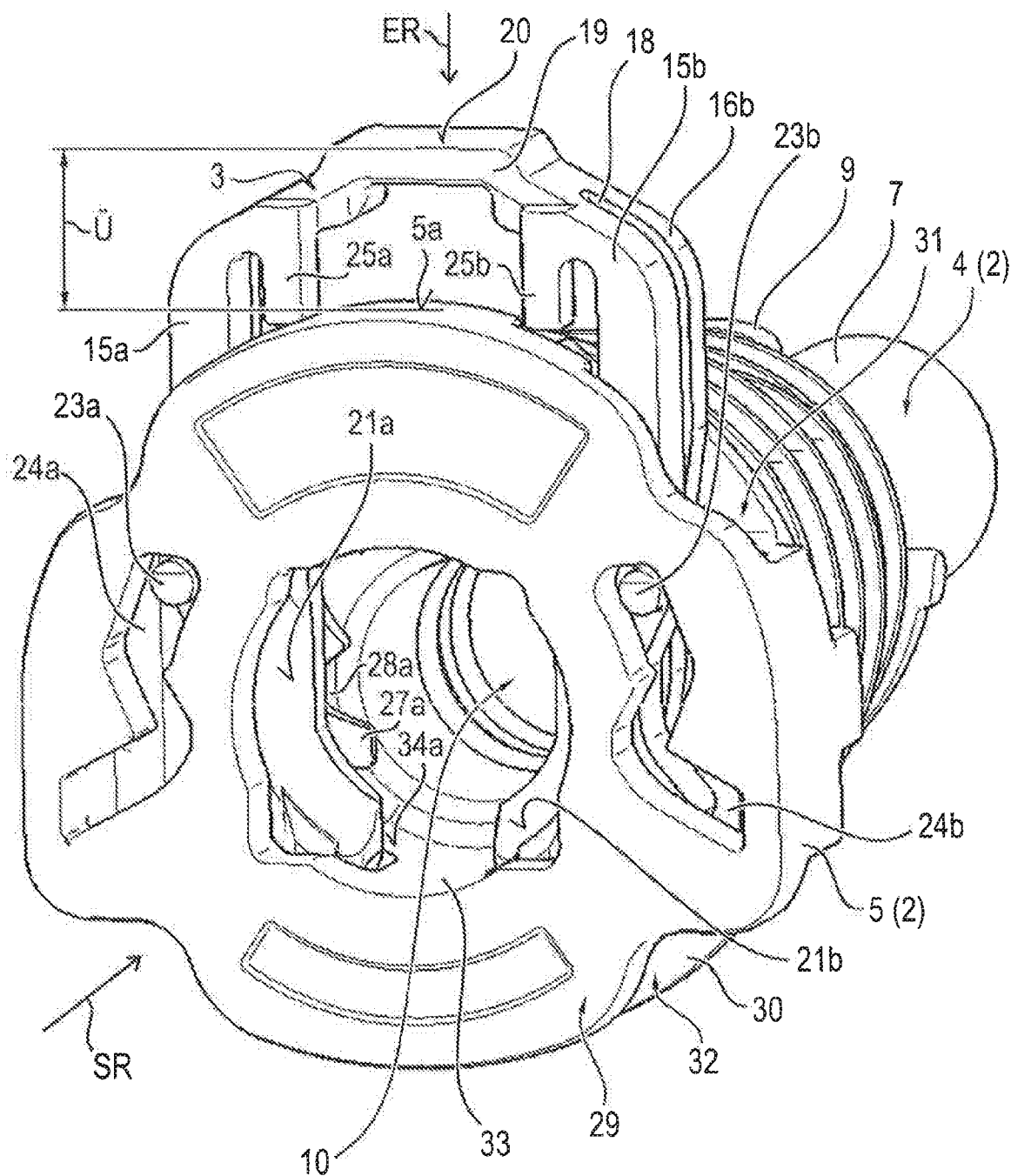
FIG. 7 shows a three-dimensional representation of the embodiment shown in FIG. 1 of a plug-in connector according to the invention in the pre-assembly state.

The retaining clip 3 is then inserted into the coupling part 2 such that the assembly state shown in FIGS. 1 and 7 is created. For the insertion of the retaining clip 3, the spring arms pairs 15a/15b, 16a/16b thereof are pressed axially toward one another, which is made possible by the slot 18. The retaining clip 3 is guided transversely to the insertion direction SR of the plug part S through the insertion opening 31, which can be facilitated by lead-in chamfers 36 on the coupling part 2 (FIG. 6b). The spring arm pairs 15a/15b, 16a/16b are then relieved of pressure such that guide pins 23a, 23b of the front spring arms 15a, 15b engage in the complementary guide slots 24a, 24b of the coupling part 2. The guide pins 23a, 23b of the spring arms 15a, 15b, in this case, slot in the ends of the guide slots 24a, 24b such that a return movement of the retaining clip 3 is blocked. With regard to further movement of the retaining clip 3 in the insertion direction ER, there is, however, still clearance, the longitudinal webs 25a, 2b acting in a stabilizing manner. The clearance is limited, however, as a result of the cams 27a, 27b of the rear spring arms 16a, 16b knocking in each case against their counter contours 34a, 34b of the blocking element 33. The retaining clip 3 is consequently situated in the insertion position EP, it being held locked in such a manner that it protrudes in relation to the outer periphery 5a of the coupling part 2 by the protrusion Ü. The plug-in connector 1 according to the invention is able to be delivered advantageously in the pre-assembled state.

Figure 8B:
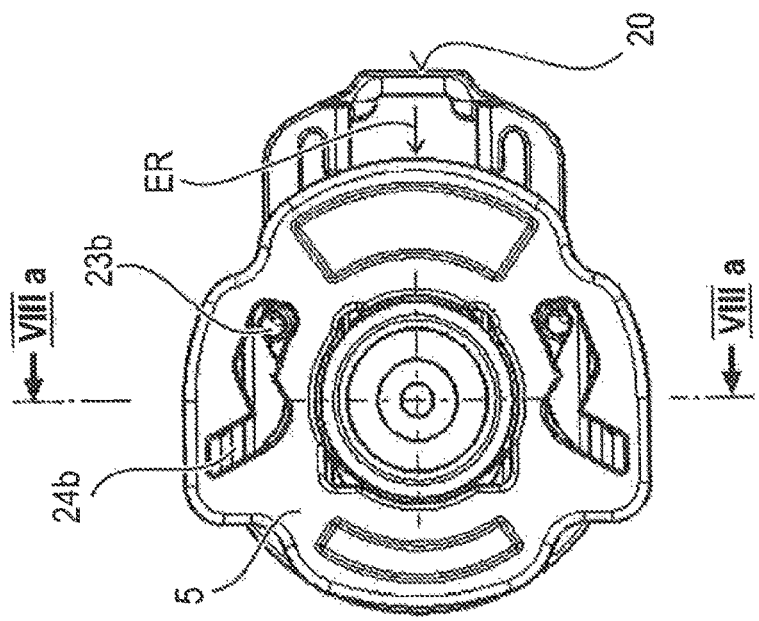
FIGS. 8a, 8b, 9a, 9b, 10a, 10b and 10c show various intermediate states between the pre-assembly state according to FIGS. 2 and 7 and the final assembly state according to FIGS. 3a, 3b, 3c of a plug-in connector according to the invention, wherein the type of presentation of FIGS. 8a and 8b and of 9a and 9b corresponds to that in FIGS. 3b and 3c and the type of presentation of FIGS. 10a, 10b and 10c corresponds to that in FIGS. 3a, 3b, 3c, FIGS. 11a and 11b each show a three-dimensional representation of a front view and a rear view of a second realization of a retaining clip for the embodiment shown in FIG. 1 of a plug-in connector according to the invention.
Figure 8A:
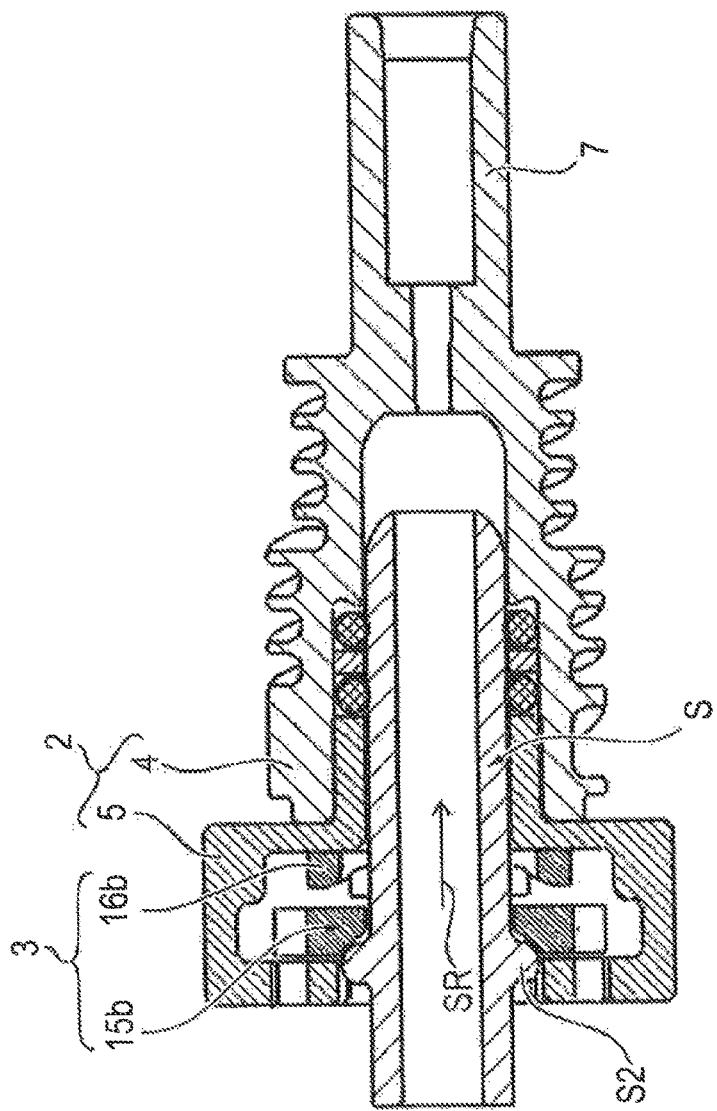
Figure 9B:
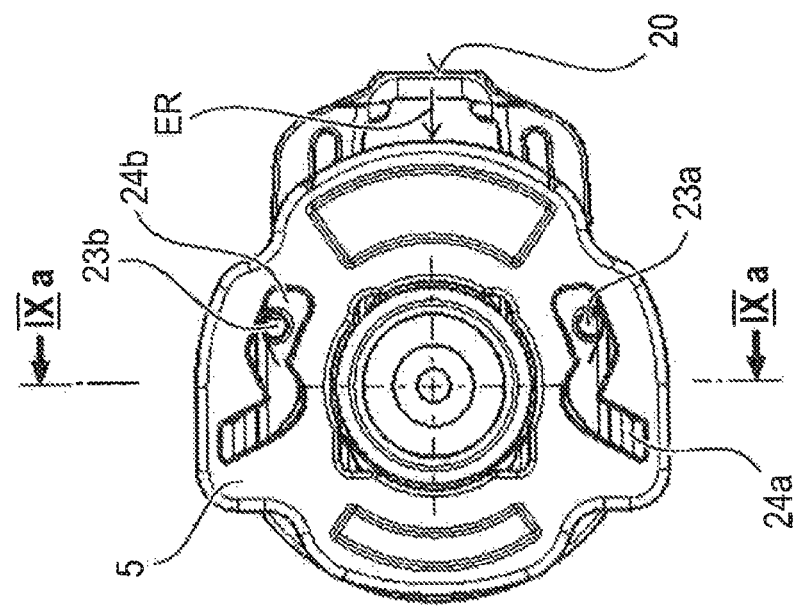
Figure 9A:
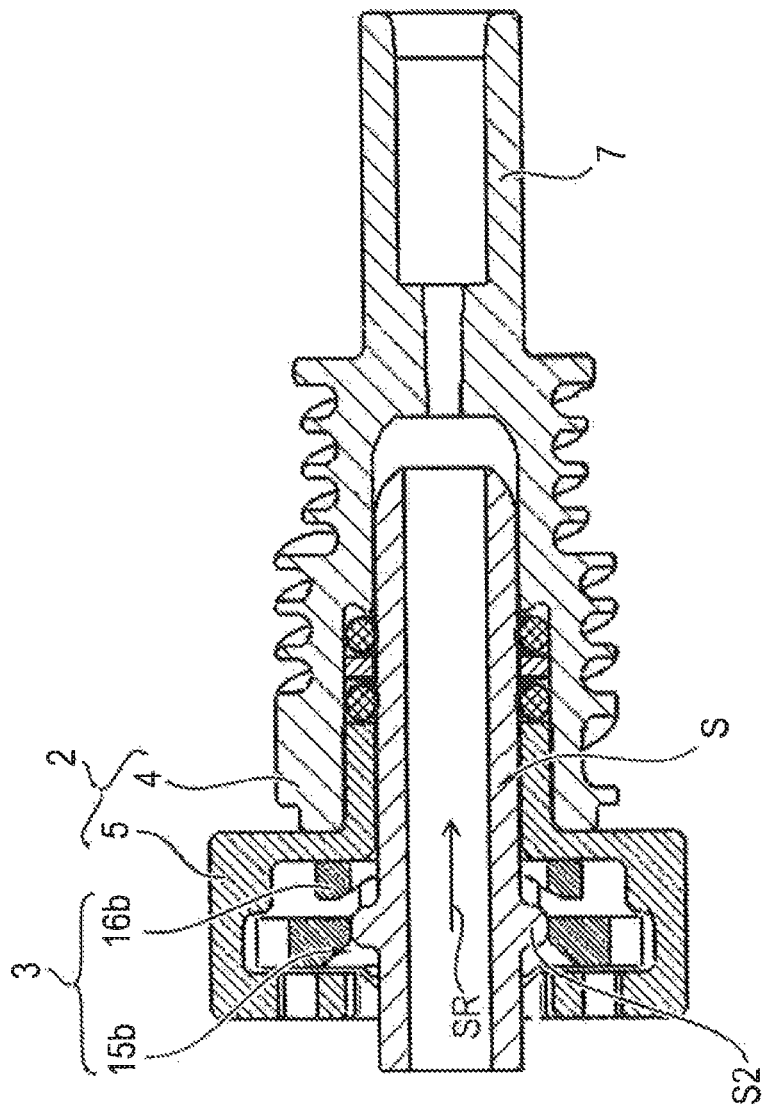
Figures 10A, 10B, 10C:
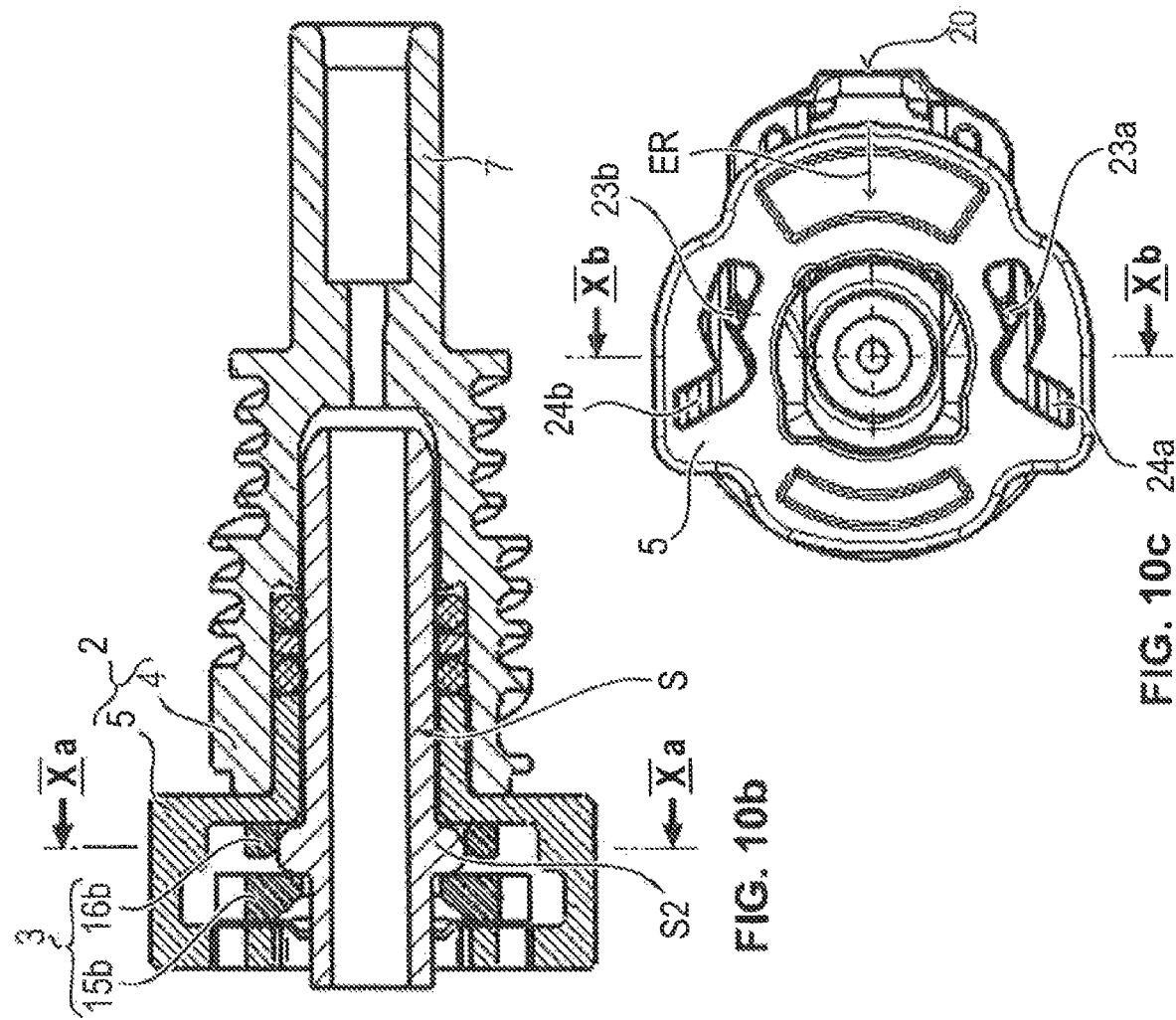

FIGS. 8a, 8b, 9a, 9b, 10a, 10b and 10c show—as already mentioned—various intermediate states between the pre-assembly state according to FIGS. 2 and 7 and the final assembly state according to FIGS. 3a, 3b, 3c of a plug-in connector 1 according to the invention. In the figures, only the respectively essential parts are designated with reference symbols for the purposes of better illustration. FIGS. 8a, 8b show the state at the start of the plugging-in operation, FIGS. 9a, 9b show the state during the plugging-in operation and FIGS. 10a, 10b and 10c show the state after reaching the final plug-in position of the plug part 1, the retaining clip 3, however, not yet being moved into its retaining position HP.

The sequence of figures illustrates that when the plug part S is plugged-in, the plug part collar S2 first of all passes along the inclined surfaces 22a, 22b of the front spring arms 15a, 15b of the retaining clip 3, as a result of which the retaining clip 3 is widened by the spring arms 15a, 15b moving radially apart from one another (FIGS. 8a, 8b) such that the collar S2 of the plug part S is able to pass the arms 15a, 15b in the axial direction X-X (FIGS. 9a, 9b) and the arms 15a, 15b finally latch behind the collar S2 (FIGS. 10a to 10c). When the plug part collar S2 is latched behind the spring arms 15a, 15b, the plug-in connection is operational, i.e. capable of holding the plug-part S and sealing it, and the pressure locking yet to be described below is also activated. Notwithstanding this, the retaining clip 3 is still in a position in which it projects out of the coupling part 2. This indicates to the installation person that the assembly of the plug-in connector 1 is not yet fully completed.

In order to complete the assembly operation, the installation person has to push the retaining clip 3 even further into the coupling part 2 in the direction of the arrows ER in FIGS. 10a, 10b such that the protrusion Ü completely disappears and the retaining clip 3 acts as a plug-in indicator (FIGS. 3a to 3c). In this case, the rear spring arms 16a, 16b are widened such that the cams 27a, 27b are able to slide past the side of the blocking element 33 (FIG. 10a) until the grooves 28a, 28b are then able to latch with the blocking means 35a, 35b of the blocking element 33 (FIG. 3a). Only then is the retaining position HP active, where the plugged-in plug part S with its collar S2 is both blocked against being pulled out in a positive locking manner in the receiving opening 10 by means of the retaining clip 3 and the plugged-in state is indicated by the retaining clip 3 as an indicator element.

During the assembly and disassembly operations, the guide pins 23a, 23b can be displaced in their guide slots 24a, 24b from their initial end stop (FIG. 8b) via the position of the—when seen in the insertion direction ER—first bend angle K1 into the position of the second bend angle K2 (FIG. 3c) and, over and above this, up to an end stop which is situated opposite in the slots 24a, 24b.

If, however, initially in the control contour of the guide slots 24a, the guide pins 23a, 23b pass into the region of the first bend angle K1, the resistance against the insertion movement in the direction ER is increased as a result of lugs 24c, 24d which are arranged on the inside in the region (see in particular FIGS. 6b, 7), so that the operator can only guide the guide pins 23a, 23b out of the region of the bend angle K1 behind the lugs 24b, 24c by using a greater amount of force—pressure onto the actuating surface 20 of the retaining clip 3. The regular completion of the plug-in operation for assembly is accordingly also indicated as a result of the guide pins 23a, 23b being situated in their guide slots 24a, 24b behind the lugs 24c, 24d in the position of the second bend angle K2.

To release the plug-in connection, the retaining clip 3 is displaced further in the actuating direction ER. During the actuation, the guide pins 23a, 23b are displaced out of the region of the bend angle K2 in the guide contour of the guide slots 24a, 24b up to the end of the elongated hole. The spring arms 15a, 15b are consequently widened such that the plug part collar S2 is released again as a result of the widening of the spring arms 15a, 15b. The guide slots 24a, 24b therefore first of all extend radially outward in a first portion, then radially inward in a second portion and then finally radially outward again in a third portion. The connection can now be released by the plug part S being pulled out of the plug-in connector 1.

If the retaining clip 3 is then released after disassembly, it slides, though on account of the resetting force set by the previously effected widening process, back into a position in which the guide pins 23a, 23b are situated in the region of the second bend angle K2 and the retaining clip 3 does not protrude from the coupling part 2. There is no longer any indication of the plugged-in state therefore for a repeat assembly.

The retaining clip 3, however, can be moved into an active position again with regard to the indication of the plugged-in state. So that the assembly person is able to determine, even in the case of a repeat assembly of the plug-in connector 1 according to the invention, whether the plug-in operation has been carried out correctly, i.e. whether, in the case of renewed assembly, the plug part collar S2 has been inserted far enough and is latched behind the spring arms 15a, 15b, the invention includes a second plug-in indicator which is triggered by plugging the plug part S into the plug-in connector 1.

As a result of plugging the plug part S into the coupling part 2, the retaining clip 3, when it is not in its insertion position EP, but is situated in its retaining position HP without a plug part S, springs back into the insertion position EP. This is effected as a result of the—as described above— widening of the front spring arms 15a, 15b by the collar S2 of the plug part S, the guide pins 23a, 23b in the guide slots 24a, 24b generating a forced movement of the retaining clip 3 in opposition to the insertion direction ER. Once again, an intermediate state is provided, as shown in FIGS. 10a to 10c, from which the final assembly can then be effected toward the state shown in FIGS. 3a to 3c.

In an advantageous configuration, the plug-in connector 1 according to the invention can additionally include a pressure locking system which prevents, in particular, the system, that is to say the plug-in connection in the assembled state when the plug part S is plugged in and is under pressure, from being able to be opened. As a result, the damaging effect of tensile forces acting on the plug part 1 in the axial direction X-X can be ruled out. In a preferred realization, such a pressure locking system is realized as a result of chamfered elevations 37 (only shown in FIG. 4), which protrude in the axial direction X-X in opposition to the plug-in direction SR, being situated on the front spring arms 15a, 15b, in particular on the free ends thereof, to which a counter contour 38 in the receiving body 5 of the retaining clip 3 corresponds in each case in a complementary manner (only shown in FIG. 6a). The counter contours 38, in this case, are indentations which engage the elevations 37 in a positive locking manner.

The second embodiment of the retaining clip 3 shown in FIGS. 11a and 11b differs from the first embodiment in that the front spring arms 15a, 15b are changed. The retaining contour formed by the spring arms 5a, 15b is widened radially inward by radially inwardly directed projections 39a, 39b, i.e. the slot 17 is narrower on the side of the connecting region 19 than in the case of the first realization of the clip, as a result of which release is prevented in an even more secure manner as the plug part S abuts against the projections 39a, 39b. The inwardly directed projections 39a, 39b, after plugging in, enable a larger wrap angle behind the collar S2 of the plug part S.

The longitudinal guiding of the retaining clip 3 is additionally altered by the longitudinal guide webs 25a, 25b of the spring arms 15a, 15b, which are directed in a secant-like manner to the coupling part 2, being situated on the radially inwardly directed projections 39a, 39b. Both variants of the retaining clip can be used in the same receiving body 5 of the retaining clip 3. The assembly of the retaining clip 3 is also effected in an analogous manner to that of the first embodiment of the retaining clip 3. The plug-in operation of the plug part S and the completion of the assembly operation is also effected in an analogous manner to that of the first embodiment of the retaining clip 3.

However, the releasing of the connection cannot be released by simply pressing onto the actuating surface 20 of the retaining clip 3 in contrast to the first clip realization as the radially inwardly directed projections 39a, 39b of the front spring arms 15a, 15b knock against the plug part S when the actuating surface 20 is pressed. The necessary opening path in the guide contour of the guide slots 24a, 24b cannot consequently be covered such that the retaining clip 3 cannot be opened by pressing further in the direction ER.

It is consequently provided that control elements 40a, 40b for manually releasing the retaining clip 3 are situated on the ends of the front spring arms 15a, 15b of the retaining clip 3. As shown in FIG. 4, such elements can also be provided on the first realization of the retaining clip 3 and with a similar function can be utilized for pushing out the retaining clip 3.

As a result of the manual release, the retaining clip 3 springs into its insertion position EP by a force being exerted onto the control elements 40a, 40b in opposition to the insertion direction ER. To release the plug part S, the retaining clip 3 must then consequently be actuated again, i.e. pressed in its insertion direction ER until, as a result of the sliding of the guide pins 23a, 23b in the guide slots 24a, 24b in the region of the first bend angle K1 up to the protruding lugs 24c, 24d, the front spring arms 15a, 15b are spread radially by such an amount that the plug part S is able to be pulled out of the plug-in connector 1 according to the invention.

The invention is not restricted to the exemplary embodiments shown and described, but also includes all realizations having the same effect in terms of the invention. It is expressly stressed that the exemplary embodiments are not restricted to all the features in combination, rather each individual part feature even separated from all the other part features can have inventive significance per se. In addition, neither is the invention restricted up to now to the feature combination defined in claim 1 but can also be defined by any arbitrary other combination of certain features of all the individual features disclosed in total. This means that, in principle, practically any individual feature of claim 1 can be omitted or replaced by at least one individual feature that is disclosed at another position in the application.

The invention claimed is:
1. A plug-in connector for hose and/or pipe connections including a plug part having a plug shaft with a collar, the plug-in connector comprising:
   a coupling part having an outer periphery and having a receiving opening into which the plug part is insertable in a plug-in direction along a longitudinal axis defined by the coupling part,
   a radially slotted retaining clip that is resiliently elastic in regions and includes at least two spring arms, the retaining clip pre-mounted on the coupling part and being radially movable between an insertion position and a retaining position, in the insertion position the plug part is insertable into the receiving opening through the retaining clip, and in the retaining position the retaining clip blocking the plug part via the retaining collar in a positive locking manner against being pulled out of the receiving opening,
   when in the insertion position the retaining clip protruding from the outer periphery of the coupling part, and when in the retaining position the retaining clip being flush with the outer periphery of the coupling part,
   the retaining clip being U-shaped when viewed in the direction of the longitudinal axis, the retaining clip including as legs of the U-shape two pairs of spring arms located diametrically opposite one another, the two pairs of spring arms being arranged one behind the other in the longitudinal direction and the two pairs of spring arms being separated from one another by a slot, an actuating surface of the retaining clip being formed by a connecting region of the U-shape extending between the legs, and only one pair of the spring arms forming latching arms radially latched to the plug part, the coupling part including a receiving body having guide slots in engagement with complementary guide pins provided on the spring arms of the retaining clip, the guide slots being provided on an end wall of the coupling part that faces the insertion direction of the plug part, a control contour being realized in each of the guide slots and by means of which, in cooperation with the complementary pins, the guide pins are displaced in the guide slots proceeding from an end stop into a region of a first bend angle of the control contour with the widening of the spring arms, and in each case a retaining lug is reached which increases the resistance against further insertion of the retaining clip.

2. The plug-in connector as claimed in claim 1, wherein the retaining clip is a unitary one piece an injection molded part formed of plastics material.

3. The plug-in connector as claimed in claim 1, wherein each of the spring arms includes a longitudinal guide web directed in a secant manner relative to the coupling part and interacting with complementary guides of the coupling part, the guide webs being located on a side of the spring arms facing the insertion direction of the plug part.

4. The plug-in connector as claimed in claim 3, wherein guide webs are arranged on both sides of a connecting region extending between the spring arms.

5. The plug-in connector as claimed in claim 3, the guide webs are arranged on radially inwardly directed projections of the spring arms.

6. The plug-in connector as claimed in claim 1, wherein one pair of the spring arms includes on central regions thereof inclined surfaces that diverge in opposition to the insertion direction of the plug part and interact with the collar of the plug part, of the two pair of spring arms the one pair of spring arms being located toward an end wall of the coupling part facing the insertion direction of the plug part.

7. The plug-in connector as claimed in claim 1, wherein one pair of the spring arms includes in regions of free ends of the spring arms inclined surfaces that diverge in opposition to the insertion direction of the plug part and interact with the collar of the plug part, of the two pair of spring arms the one pair of spring arms being located away from an end wall of the coupling part facing the insertion direction of the plug.

8. The plug-in connector as claimed in claim 1, wherein the coupling part includes a sleeve part connected to a receiving body, the receiving body receiving the retaining clip and being in a shape of a ring, the sleeve part and the receiving body formed as injection molded parts of plastics material.

9. The plug-in connector as claimed in claim 1, wherein a sealing package is arranged on the sleeve part, the sealing package including two sealing rings and a spacer ring located there between.

10. The plug-in connector as claimed in claim 9, wherein the receiving body defines a housing for the retaining clip, the housing having a hollow cylindrical shape closed in each case at respective end walls of the hollow cylinder and on two sides comprises diametrically opposed peripheral openings in which the retaining clip is received, the peripheral openings being an insertion opening and an outlet opening.

11. The plug-in connector as claimed in claim 1, wherein control the control contour in cooperation with the complementary guide pins delimiting an insertion movement and an extension movement of the retaining clip transversely to the plug-in direction of the plug part, and when the retaining clip is moved transversely to the plug-in direction of the plug part, the control contour in cooperation with the complementary guide pins cause the spring arms, on which the guide pins are situated, to move one of radially outward or radially inward.

12. The plug-in connector as claimed in claim 1, wherein the control contour in cooperation with the complementary guide pins, is configured to, when the retaining clip is situated in its retaining position without a plug part, cause the retaining clip to spring into the insertion position upon plugging of the plug part into the coupling part.

13. The plug-in connector as claimed in claim 1, wherein the coupling part includes a receiving body in which the retaining clip is received and guides are provided in the receiving body for complementary guide webs provided on the spring arms of the retaining clip, the guides being provided on an inside of an end wall of the coupling part that faces the insertion direction of the plug part.

14. The plug-in connector as claimed in claim 1, wherein the coupling part includes a receiving body in which the retaining clip is received, the receiving body including an outlet opening and a blocking element with a counter contour, the blocking element located in a middle region of the outlet opening, the counter contour abutting cams arranged at ends of the spring arms, the blocking element further including releasable blocking features cooperating with grooves provided in the spring arms of the retaining clip and forming a positive and non-positive locking connection.

15. The plug-in connector as claimed in claim 1, wherein control elements configured to manually release the retaining clip are situated on the ends of spring arms of the retaining clip.

16. The plug-in connector as claimed in claim 1, wherein guide elements configured to receive electric heating media are situated on a shell in the region of a heating portion of the coupling part.

17. The plug-in connector as claimed in claim 1, wherein chamfered elevations, which protrude in the longitudinal direction in opposition to the plug-in direction, are situated on each of the spring arms of one pair of the spring arms, the one pair being located toward an end wall of the coupling part that faces the insertion direction of the plug part, the chamfered elevations provided on the free ends the spring arms, a counter contour that is complementary to the chamfered elevations is provided on the retaining clip as an indentation.

18. The plug-in connector as claimed in claim 1 as an ensemble with a plug part realized according to standard SAE J 2044, the plug part including a locking portion behind a collar that is engaged in a retaining position of the retaining clip, wherein the retaining clip is held locked in the retaining position in such a manner that the retaining clip closes off flush with the outer periphery of the coupling part of the plug-in connector.

19. The plug-in connector as claimed in claim 18, wherein the plug part also comprises a sealing portion on which a sealing package is arranged.

20. A plug-in connector for hose and/or pipe connections including a plug part having a plug shaft with a collar, the plug-in connector comprising:
   a coupling part having an outer periphery and having a receiving opening into which the plug part is insertable in a plug-in direction along a longitudinal axis defined by the coupling part,
   a radially slotted retaining clip that is resiliently elastic in regions and includes at least two spring arms, the retaining clip pre-mounted on the coupling part and being radially movable between an insertion position and a retaining position, in the insertion position the plug part is insertable into the receiving opening through the retaining clip, and in the retaining position the retaining clip blocking the plug part via the retaining collar in a positive locking manner against being pulled out of the receiving opening, when in the insertion position the retaining clip protruding from the outer periphery of the coupling part, and when in the retaining position the retaining clip being flush with the outer periphery of the coupling part, and wherein on a central region of each of the spring arms is provided a guide pin extended in engagement with a complementary guide slot on the coupling part, the guide pins being located on a side of the spring arms facing the insertion direction of the plug part.

21. A plug-in connector for hose and/or pipe connections including a plug part having a plug shaft with a collar, the plug-in connector comprising:

a coupling part having an outer periphery and having a receiving opening into which the plug part is insertable in a plug-in direction along a longitudinal axis defined by the coupling part, a radially slotted retaining clip that is resiliently elastic in regions and includes at least two spring arms, the retaining clip pre-mounted on the coupling part and being radially movable between an insertion position and a retaining position, in the insertion position the plug part is insertable into the receiving opening through the retaining clip, and in the retaining position the retaining clip blocking the plug part via the retaining collar in a positive locking manner against being pulled out of the receiving opening, when in the insertion position the retaining clip protruding from the outer periphery of the coupling part, and when in the retaining position the retaining clip being flush with the outer periphery of the coupling part, the retaining clip being U-shaped when viewed in the direction of the longitudinal axis, the retaining clip including as legs of the U-shape two pairs of spring arms located diametrically opposite one another, the two pairs of spring arms being arranged one behind the other in the longitudinal direction and the two pairs of spring arms being separated from one another by a slot, an actuating surface of the retaining clip being formed by a connecting region of the U-shape extending between the legs, and on free ends of one pair of the spring arms are formed cams with tips directed inwardly toward one another, of the two pair of spring arms the one pair of spring arms being located away from an end wall of the coupling part facing the insertion direction of the plug part.

22. The plug-in connector as claimed in claim 21, wherein grooves are provided in a region of the free ends of the one pair of spring arms in or next to the end cams, the grooves defining openings directed inwardly toward one another and interacting with complementary retaining contours of the coupling.

* * * * *